United States Patent
Chen et al.

(10) Patent No.: US 11,878,911 B2
(45) Date of Patent: Jan. 23, 2024

(54) METHOD FOR PRODUCING A HYDROPHILIC AEROGEL GRANULE AND APPLICATION OF THE PRODUCT THEREOF

(71) Applicant: Taiwan Aerogel Technology Material Co., Ltd., Tainan (TW)

(72) Inventors: Jean-Hong Chen, Tainan (TW); Shiu-Shiu Chen, Tainan (TW)

(73) Assignee: TAIWAN AEROGEL TECHNOLOGY MATERIAL CO., LTD., Tainan (TW)

( * ) Notice: Subject to any disclaimer, the term of this patent is extended or adjusted under 35 U.S.C. 154(b) by 1113 days.

(21) Appl. No.: 16/675,700

(22) Filed: Nov. 6, 2019

(65) Prior Publication Data

US 2021/0130177 A1    May 6, 2021

(51) Int. Cl.
    *C01B 33/158*      (2006.01)
    *B01J 13/00*        (2006.01)

(52) U.S. Cl.
    CPC ....... *C01B 33/1585* (2013.01); *B01J 13/0091* (2013.01)

(58) Field of Classification Search
    CPC ..... C01B 33/1585; C01B 33/00; C01B 33/33; B01J 13/0091; C04B 14/064
    See application file for complete search history.

(56) References Cited

U.S. PATENT DOCUMENTS

| | | | |
|---|---|---|---|
| 2012/0037838 A1* | 2/2012 | Bauer | C04B 14/064 252/62 |
| 2020/0299480 A1* | 9/2020 | Akasu | B01J 13/0091 |
| 2020/0339762 A1* | 10/2020 | Chen | C01B 33/159 |

\* cited by examiner

*Primary Examiner* — Smita S Patel
(74) *Attorney, Agent, or Firm* — Locke Lord LLP; Tim Tingkang Xia, Esq.

(57) ABSTRACT

A method for producing a hydrophilic aerogel granule is provided, which includes the steps of: mixing for the siloxane solvent mixture preparation, hydrolysis with proper acid catalyst, condensation dispersion by introducing a proper alkali catalyst into the mixture and dispersing it with hydrophobic dispersion solvent to obtain wet gel, aging under a specific temperature, disintegration dispersion for disintegrating the wet gel and dispersing it in the dispersion solvent, high temperature solvent exchange under ambient temperature with dispersion solvent, and solvent evaporation for removing the dispersion solvent.

6 Claims, 5 Drawing Sheets

METHOD FOR PRODUCING A HYDROPHILIC AEROGEL GRANULE AND APPLICATION OF THE PRODUCT THEREOF

FIELD OF THE INVENTION

The present invention is related to a method for producing an aerogel granule, and more particularly to a method for producing a hydrophilic aerogel granule with mixed organic solvents, which causes reduction of the surface tension force of hydrogel and avoids the collapse of the 3D network of aerogel granule. Therefore, it is possible to proceed under ambient pressure, and the application of the product thereof.

BACKGROUND OF THE INVENTION

Aerogel is a porous material with 3D network structure and has a low density of 0.005-0.2 $g/cm^3$, a high specific surface area of 500-2,000 $m^2/g$, and a low K value of 0.02-0.036 w/mK. This novel material shows excellent properties on thermal resistance and fireproofing. However, it is a fact that the aerogel amount practically needs to reach a certain level to fulfill the foregoing function. Generally, the commercially available aerogel products are usually prepared as hydrophobic form and show better performance on thermal resistance. However, due to the intrinsic properties, the hydrophobic aerogel powders cannot disperse well in the substrate matrix, which cause incontinence in the post-manufacturing. Besides, it can also cause dust hazard and dust explosion. For example, the hydrophobic aerogel powder can't form a well mixture with a high hydrophilic material (e.g. concrete or cement painting) and will result in a product with low mechanical properties and lack of thermal resistance ability. In addition, hydrophobic aerogel powder contains great amounts of carbohydrates which might raise up a flash explosion.

Normally, sol-gel method is mostly used in preparing aerogel. Generally, a mixture of precursors (alkoxysilane, tetramethyl orthosilicate or water glass etc.) and organic solvents are prepared. Hydrolysis is initiated by acid catalyst followed by the addition of alkali catalyst for the condensation reaction. With the progress of time, the solution obtained from the condensation reaction will further condense to form the gel. After aging, the internal bonding of the gel will be more stable and form a 3D network structure. Finally, solvent exchange is proceeded with n-butanol, n-hexanol, n-hexane, or cyclohexane followed by the solvent evaporation process utilizing supercritical drying (SCD) technique. Then, the dry powder of aerogel was prepared.

Supercritical drying technique or solvent exchange method are utilized in the aerogel preparation to avoid the structure collapsing which resulted from the surface tension of water. However, this technique needs to proceed under extremely high pressure, and thus can only be used to prepare small amounts of samples. Moreover, solvent exchange is also time consuming and therefore is not proper for industrial manufacturing and the cost effectiveness.

The hydrophobic aerogel preparation is also prepared by sol-gel methods. For example, alkoxysilane precursor (methyltrimethoxysilane (MTMS), methyltriethoxysilane (MTES)) and organic solvent are mixed and followed by the addition of alkali catalyst for the hydrolysis reaction. Gels are formed with the condensation reaction after a certain time. The drying process is performed under ambient temperature/pressure or at high temperature/pressure. Another example, by mixing the alkoxysilane (tetraethoxysilane (TEOS), tetramethoxysilane (TMOS)) and organic solvents together, the acid catalyst is then added to initiate the hydrolysis reaction. After a while, an alkali catalyst was added to trigger the condensation reaction. A stable 3D network structure will be gradually established during the condensation reaction. Next, solvent exchange steps were performed with n-butanol, n-hexanol, n-hexane, or cyclohexane followed by the modification with trimethylchlorosilane or other hydrophobic silane compounds. Finally, solvents are removed by utilizing the ambient pressure drying (APD) technique. Then, the dried aerogel bulk materials are prepared.

The APD method described above usually required at least 24 hours of several times of solvent exchange to reduce the surface tension that might eventually crashing the 3D structure. Furthermore, the modification step followed by solvent exchange also takes a long period of time. Therefore, it does not serve with cost effectiveness well.

A prior aerogel composite with fibrous batting is a kind of mixture, in which a non-polymeric functional organic compound with one or two C—Si bonds was used as hydrophobic modifier. The organic compounds and the inorganic aerogel network were bonded by the C—Si bonds. The product was dried by SCD.

A prior improved hydrophobic aerogel materials" is a composite. It has excellent performance under aqueous environment, also shows remarkable flaming and self-heating resistance characters. It also provided a method in the previous patent to improve the hydrophobic ability, water absorption ability, burning heat, or the initial temperature of pyrolysis.

The precursors used in the prior sol-gel synthesis were alkoxysilane (such as TEOS) or silicate salt (such as sodium silicate) with organic solvent. The obtained gel was modified with specific modifier so that the surface of gel will become hydrophobic in the surface and can avoid the collapse of the 3D network. Hence, it is possible to proceed room temperature drying.

SUMMARY OF THE INVENTION

One objective of this invention is to improve the drawback of the hydrophobic aerogel powder. For example, it is difficult to mix the powder well with other materials, or the thermal proof ability is inhibited by the materials inside the composite, or the powder might cause dust hazard and dust explosion.

Another objective of this invention is to prepare an optimized hydrophilic aerogel that is designed for concrete (density is of 1.3-2.0 $g/cm^3$) or cement (density is of 1.15-1.55 $g/cm^3$). Our aerogel can strengthen up the interaction of concrete or cement. Besides, it is easy to blend our aerogel with other materials that will not cause a phase separation.

A further objective of this invention is to optimize the sol-gel method by combining different hydrophobic solvent to reduce the surface tension that caused from water molecules and to ease the shrinkage of aerogel. Thus, it is possible for manufacturing the aerogel in continuous production line or large lot production with excellent quality of granule.

Still another objective of this invention is to disclose a technique that can obtain high quality silica aerogel with high porosity and low bulk density without using solvent exchange process or SCD technique which are time-consuming or high-cost.

Yet another objective of this invention is to disclose a technique that can produce a hydrophilic aerogel with the particle size ranged from hundreds of micrometers to dozens of millimeters. It can be combined with commercial cement to form the aerogel RC concrete, aerogel-coated RC concrete or satin finished aerogel for the application of enhancing the fireproof ability of container type houses.

Therefore, this invention provides a process of producing aerogel granules with the size ranged from hundred micrometers to dozen millimeters by combining the mixing solvent effect and sol-gel method. It includes the following steps of: (1) mixing: alkoxysilane was added to a proper solvent and well mixed to form a homogeneous solution; (2) hydrolysis: acid-catalyst was utilized to initiate the hydrolysis reaction; (3) condensation dispersion: alkali-catalyst was then introduced to the solution to facilitate the condensation reaction, while a hydrophobic solvent was added into the solution followed by vigorous stirring, the mixture was let standing for a few minutes for the silicon oxygen bonding formation; (4) aging: this step was carried out under a certain range of temperature to stabilize the wet gel structure; (5) disintegration dispersion: a certain amount of hydrophobic solvent was added, and the wet gel will break into small particle with the size ranged from hundred micrometers to dozen millimeters, these particles were dispersed homogeneously in the solution; (6) high temperature solvent exchange: this step was performed under normal pressure and at high temperature until the wet gel had become transparent or transparent with the tint of blue light; and (7) solvent evaporation: this step was processed under ambient pressure, wherein structure shrinkage caused by the surface tension of water molecule can be prevented by using the hydrophilic-hydrophobic solvent interaction, and the mix-solvent was then evaporated in this step.

The alkoxysilane used in this invention can be a single compound or a mixture listed as below: alkoxysilane, such as tetramethoxysilane (TMOS), tetraethoxysilane (TEOS); R-alkoxysilane, such as R-TMOS or R-TEOS, where R— represents hydrophilic functional groups, which includes: carboxyl groups —COOH, amino groups —$NH_2$, imino groups —NH, hydroxyl groups —OH, amide groups —CONH—, epoxy groups —CH(O)CH, urea groups —NHCONH, cyanate groups —N=C=O, or isocyanate groups —N—CO—N—. The number of carbon atoms is ranged from 1 to 8.

The solvent used in this invention can be a single solvent or a multi-solvent system as listed: water, distilled water, treated water, and alcohols.

The hydrophobic solvents introduced in the dispersion step, i.e. the dispersion solvent, can be prepared according to the demand in product processing by adjusting the volume of the hydrophilic and hydrophobic solvents. The addition of the calculated amount of dispersion solvents during the condensation reaction of alkoxysilane and/or R-alkoxysilane increases the porosity of wet gel. The interaction of solvent molecules and silica cluster in condensation reaction can be controlled by adjusting the ratio of hydrophilic and hydrophobic solvent, and hence to control the particle size and pore distribution of gel by carefully manipulating the behavior of spatial arrangement of silica clusters.

The solvent exchange in wet get step was carried out under normal pressure and at high temperature using hydrophobic solvents. Since the solvent molecules move faster at high temperature, this step can be accelerated and hence lower the processing time. By using the character of co-boiling effect of the mixture of different hydrophobic and hydrophilic solvents, the mixture of water, ethanol and high volume of hydrophobic solvents that were inside the wet get was brought to the boiling state during the high temperature solvent exchange process. Solvents were rapidly exchanged during this process until the color of wet gel becomes completely transparent or transparent with tint of light blue. Thereafter, the hydrophilic aerogel product with low density and high porosity is prepared.

Solvent evaporation and drying steps are processed at ambient pressure and high temperature. After drying step, the aerogel granules size range from hundreds of micrometers to dozens of millimeters. The entire production process of this invention is simple and straightforward. It takes 12 to 24 hours for a single batch and the process is suitable for continuous production type to produce the granular aerogel with hydrophilic functional groups or even specific hydrophilic functional groups with high production efficiency.

The characteristics of this invention are as below:

First, by using the characteristics of co-boiling effect of hydrophobic and hydrophilic solvents mixture, this invention applies different mixing ratio of hydrophobic and hydrophilic solvents during the solvent exchange step to reduce the water molecules surface tension of the solvent mixture during high temperature exchange process. Therefore, the produced hydrophilic aerogel with high porosity by this method can clearly avoid the shrinkage during the solvent exchange and evaporation steps. The high porosity aerogel prepared with this method shows remarkable improvement in the degree of thermo insulation and fire resistance, and therefore increases the practical usefulness of the aerogel.

Secondly, the density, porosity, and pore size of the hydrophilic aerogel prepared with this method is adjustable by the solvent content, solvent viscosity, the dose of acid- and/or alkali-catalysts, the composition of dispersion solvents, the amount of dispersion solvents, temperature at exchange step and the stirring rate etc.

Thirdly, hydrophilic aerogel granules with the size of diameter ranged from hundreds of micrometers to dozens of millimeters can be obtained by the process of adding a calculated amount of dispersion solvents after the condensation dispersion and followed by solvent evaporation at high temperature to remove the water base solvents. By this method, the produced hydrophilic aerogel has excellent dispersion quality and can be blended with base materials in high content. The high degree of porosity in this hydrophilic aerogel granules will be maintained, and therefore, improve the thermo insulation and fire resistance of substrates.

Furthermore, the surface modification of the hydrophilic aerogel produced by this method can be achieved by different hydrophilic functional groups. Hence, the hydrophilic aerogel can be easily and homogenously dispersed in different kind of hydrophilic solvents, for example, water or other hydrophilic solvent; hydrophilic adhesives, such as water base PU, PMMA, water base paints; or mixed with hydrophilic materials, like cement and clay. The mixture or composite materials are structurally stable with high mechanical strength and good weathering resistance.

Moreover, by adjusting the ratio of hydrophobic and hydrophilic solvents and temperature, the solvent evaporation step can be compressed to 12-24 hours (for the production about 150-360 L in one batch). Therefore, the production efficiency of hydrophilic aerogel manufacturing is improved.

DETAILED DESCRIPTION OF THE INVENTION

The detailed description and preferred embodiments of the invention will be set forth in the following content, and provided for people skilled in the art so as to understand the characteristics of the invention.

Figure 1:
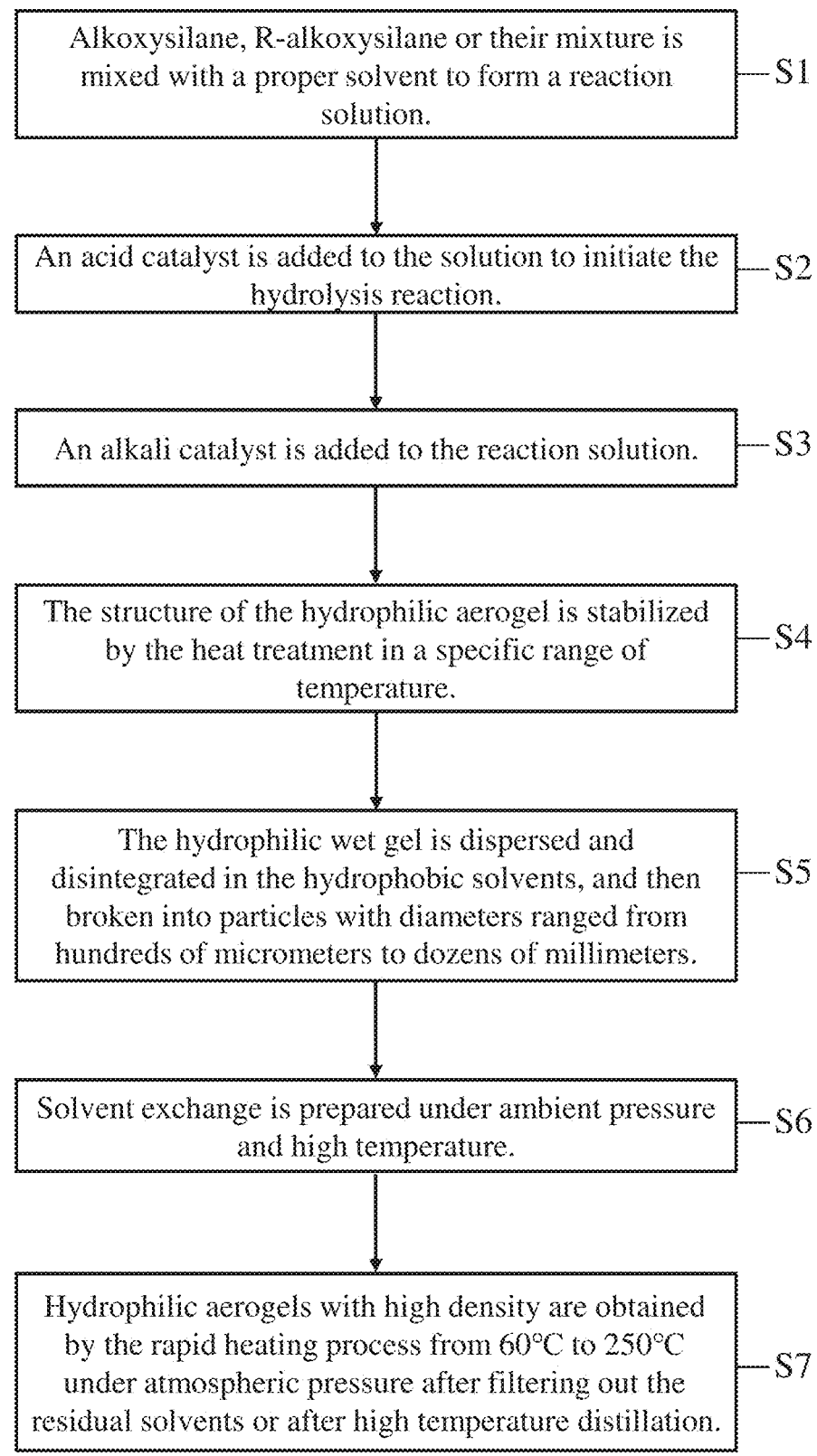
FIG. 1: the flow chart of hydrophilic aerogel manufacturing process diagram of this invention.

FIG. 1 discloses the hydrophilic aerogel manufacturing process, which includes the following steps of: mixing (S1), hydrolysis (S2), condensation dispersion (S3), aging (S4), disintegration dispersion (S5), high temperature solvent exchange (S6), and solvent evaporation (S7).

Mixing (S1): The reaction solution is prepared by mixing alkoxysilane, R-alkoxysilane or their mixtures with proper solvents. The alkoxysilane can be tetramethoxysilane (TMOS), tetraethoxysilane (TEOS) or tetramethyl orthosilicate. The R-alkoxysilane can be R-tetramethyl orthosilicate or R-tetraethyl orthosilicate, where R— represents hydrophilic functional groups, which includes —COOH, —NH$_2$, —NH, —OH, —CONH—, —CH(O)CH, —NHCONH, —N=C=O, or —N—CO—N—. The number of carbon atom is ranged from 1 to 8. The purpose of the addition of R-alkoxysilane is to modify the micro-structure of aerogel and control the content of functional groups. The total content of alkoxysilane and R-alkoxysilane is ranged from 3.0 to 60.0 mol % and the amount of solvent is range between 97.0 to 40.0 mol %.

The solvents used in the mixing process can be water, distilled water, deionized water, secondary distilled water, alcohol with 1 to 10 carbons, ether with 2 to 10 carbons, or ketone with 3 to 10 carbons. More specifically, those organic solvents can be ethanol, acetone, ethoxyethane, or dibutyl ether.

Hydrolysis (S2): An acid catalyst is added to the solution obtained in the mixing step (S1) to initiate the hydrolysis reaction. The ratio of alkoxysilane and R-alkoxysilane to acid catalyst is ranged from 1:0.5 to 1:0.001; In addition, some of these R-alkoxysilane do not require catalysts to proceed the hydrolysis reaction.

The hydrolysis reaction time was about 360 minutes when the ratio of the total content of alkoxysilane with R-alkoxysilane to the catalyst equals to 1:0.001; while it only takes about 10 min as the ratio of the total content of alkoxysilane with R-alkoxysilane to the catalyst was increased to 1:0.5. Accordingly, the processing time of hydrolysis was related to the concentration of the catalyst.

Condensation dispersion (S3): Alkali catalyst was added to the reaction solution. The molar ratio of acid catalyst to alkali catalyst was between 1:1 to 1:3.

The experimental results had shown that the condensation time (i.e. the gelation time) decreased as the concentration of alkali-catalyst increased. When the molar ratio of acid catalysts to alkali catalysts equaled to 1:1, the gelation time was about 1,600 minutes; when the molar ratio changed to 1:3, the gelation time would become 1 minute only. Hence, the entire processing time could be controlled by the content of alkali catalyst.

The reaction solution had become a sol-like solution at the end of the condensation dispersion step. A significant amount of hydrophobic dispersion solvent was then added into the sol-like solution followed by rapid stirring (stirring speed was set between 100 to 500 rpm). During this process, the strong interaction between water molecules and silica structure was suppressed by the interference of solvent molecules from the dispersion solvents. Finally, the sol was converted into hydrophilic wet gel. The volume ratio of the reaction solution and dispersion solvent was set from 1:0.0 to 1:0.3. As the content of the hydrophobic dispersion solution became higher, the gel's porosity went higher and the density became lower. However, the appearance of the gel became less transparent as the degree of phase separation intensified.

The solvents used in condensation dispersion (S3) could be alcohols with 2 to 10 carbon atoms, aromatics with 6 to 10 carbon atoms, alkanes with 5 to 10 carbon atoms, aromatic alcohols with 2 to 6 carbon atoms, aromatic halide with 6 to 12 carbon atoms, or alkyl halide with 6 to 12 carbon atoms. More specific, the solvents can be methanol, ethanol, cyclohexane, n-hexane, benzene, or toluene.

Aging (S4): The structure of the hydrophilic aerogel is stabilized by the heat treatment in a specific range of temperature. More specific, the aging temperature can be of 20-80° C. For example, the aging temperature is of 40-50° C.

Disintegration dispersion (S5): The hydrophilic wet gel was dispersed and disintegrated in the hydrophobic solvents, and was broken into particles with the diameters ranged from hundreds of micrometers to dozens of millimeters.

The hydrophobic solvents use in disintegration dispersion (S5) can be aromatics with 6 to 10 carbon atoms, alkanes with 5 to 10 carbon atoms, or their mixtures. To be more specifically, the solvents can be cyclohexane, n-hexane, benzene, or toluene.

High temperature solvent exchange (S6): This step was prepared under ambient pressure and high temperature. The high temperature solvent exchange process used both hydrophilic and hydrophobic solvents. Utilizing the co-boiling effect of water, ethanol and hydrophobic solvents, water molecules that trapped inside the micropore of wet gel were replaced and the wet get became totally transparent or slightly with blue tone. Thereafter, the hydrophilic aerogel product with low density and high porosity was manufactured. More specific, the solvent exchange temperature can be of 50-160° C.

Solvent evaporation (S7): Hydrophilic aerogels with low density were obtained by the rapid heating process from 70° C. to 150° C. under atmospheric pressure after filtering out the residual solvents or after high temperature distillation. Furthermore, the solvent evaporation process was preceded from 70° C. to 150° C. by the high temperature flow bed or oven and the dried hydrophilic aerogel granule were obtained. More specific, the high temperature distillation is performed under 90° C. to 150° C. and atmospheric pressure.

According to this process, hydrophilic aerogel granule with the diameter size ranged from hundreds of micrometers to dozens of millimeters were prepared. In addition, surface modification was made available by using this invention. With different kinds of surface modifier, the aerogel could be applied to different kind of hydrophilic cements, paints and adhesives with proper organic solvents, and thereby the application areas of the aerogel are expanded. Especially in the preparation of fireproof concrete area, hydrophilic aerogels can be used to improve the degree of fire proof and heat resistance significantly.

Figure 2:
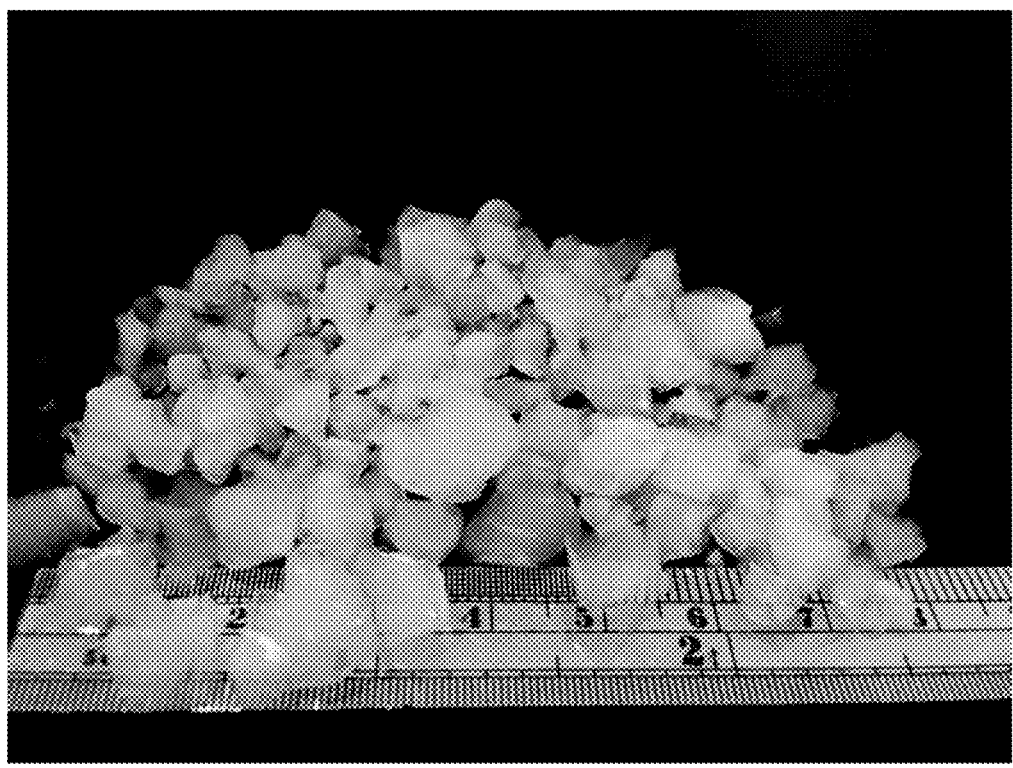
FIG. 2: the appearance of the hydrophilic aerogel prepared with this invention.
Figure 3:
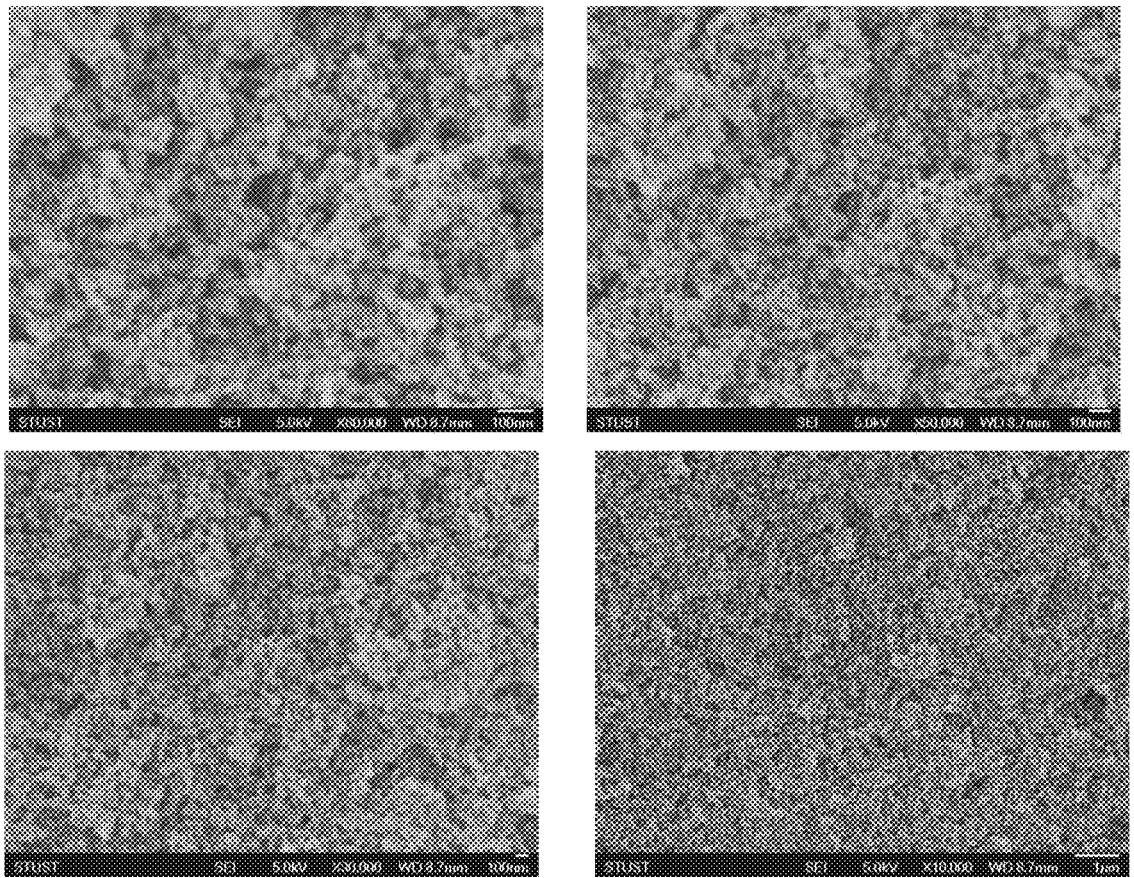
FIG. 3: the SEM image of the aerogel prepared with this invention.

The appearance and SEM image of the hydrophilic aerogel granule are shown in FIGS. 2-3. The results indicated that the size of the aerogel granule was between several millimeters to dozens of millimeters in diameters.

Figure 4:
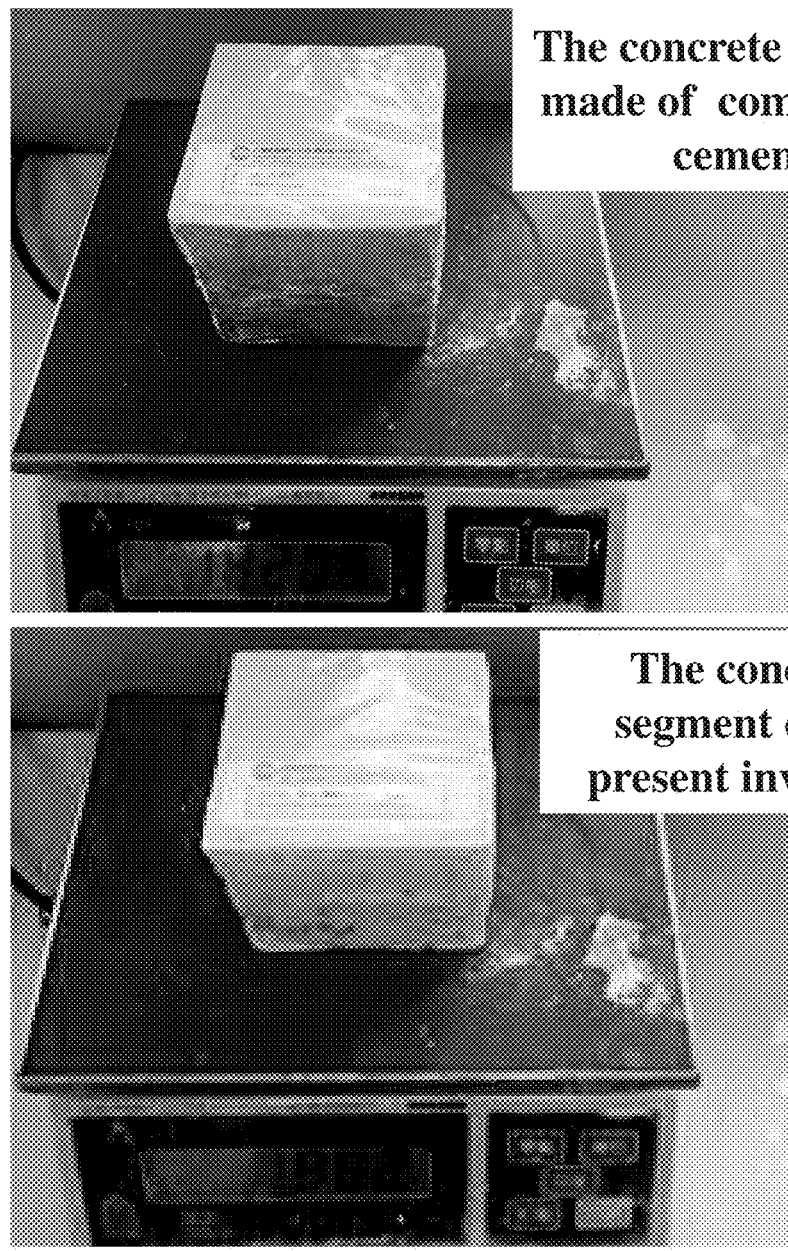
FIG. 4: the appearance and weight of the concrete made with the hydrophilic aerogel and commercial cement-sand. (the ratio of aerogel to cement-sand is of 2 to 1).

FIG. 4 displays the appearance and weight of the concrete segments prepared with cement and hydrophilic aerogels (1:2 volume ratio). The weight of the samples prepared from commercial cement and cement-aerogel are of 1420.5 g and 788.2 g, respectively. The concrete segment weight prepared with this invention is only 55% of the commercial cement sample under the same volume. Therefore, the hydrophilic aerogel granule prepared by this method can be applied to the light weight architectural design areas.

Figure 5:
FIG. 5: the cross-section image of the concrete made with the hydrophilic aerogel and commercial cement.

FIG. 5 presents the cross-section image of the concrete sample described above. Aerogel Granules dispersed homogeneously in the cement. In other words, this composite material did not exhibit a macroscopic phase separation.

Concrete samples prepared by this method as described above were examined by the surface temperature under the high temperature environment. The thickness of concrete specimen was of 3 cm. Concrete specimens were placed on the heating plate at 70° C. for 6 hours under the room temperature environment. The measured surface temperature of concrete specimen without aerogel was of about 47.4° C., while the surface temperature of concrete specimen with aerogel granule prepared by this method was only of 32° C. The tested results indicate the superior heatproof character of the product using aerogel granule prepared by this method.

A comparison experiment with the extremely high temperature torch at 1200° C. heating at one side of the surface for 1 hour was carried out for above samples. The resulted surface temperature at the opposite side of concrete specimen were of 321.1° C. and of 74.7° C. for specimen without aerogel granule and with the aerogel granule respectively. This experiment demonstrated the outstanding character of fire resistance products of aerogel granule prepared by this method.

While the invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for producing a hydrophilic aerogel, comprising:
   a mixing step, wherein a reaction solution is prepared by mixing an alkoxysilane with a solvent;
   a hydrolysis step, wherein an acid catalyst is added into the reaction solution for hydrolysis reaction;
   a condensation dispersion step, wherein an alkali catalyst is added into the reaction solution to initiate condensation reaction, and during the condensation reaction, a hydrophobic disperse solvent is added and the reaction solution is stirred at a stirring rate from 100 to 500 rpm to form an uniform wet gel structure of aerogel;
   an aging step, wherein the uniform wet gel structure of aerogel is stabilized under a temperature from 20° C. to 80° C. to form an aged aerogel;
   a disintegration dispersion step, wherein the aged aerogel is dispersed in a hydrophobic dispersion solvent, and then the aged aerogel is broken into particles with a diameter ranging from several millimeters to dozens of millimeters;
   a solvent exchange step, wherein ambient pressure and a temperature from 50° C. to 160° C. are introduced to make the aerogel completely transparent or transparent with a tint of blue light; and
   a solvent evaporation step, wherein the hydrophobic dispersion solvent is removed by a distillation at a temperature from 70° C. to 150° C. or filtered by filter, and then the aerogel is dried to obtain the hydrophilic aerogel.

2. The method as claimed in claim 1, wherein the alkoxysilane is an alkoxysilane compound or a R-alkoxysilane compound; the alkoxysilane compound is tetramethoxysilane (TMOS), tetraethoxysilane (TEOS), or tetramethyl orthosilicate; the R-alkoxysilane compound is R-tetramethyl orthosilicate or R-tetraethyl orthosilicate, the R— represents a hydrophilic functional group including a carboxyl group, an amino group, an imino group, a hydroxyl group, an amide group, an epoxy group, an urea group, a cyanate group, or an isocyanate group, and a carbon number of the R— is of 1 to 8.

3. The method as claimed in claim 1, wherein the solvent contains water, treated water, distilled water or ethanol.

4. The method as claimed in claim 1, wherein the hydrophobic disperse solvent is alcohol, aromatic, or alkane; the alcohol is methanol or ethanol; the aromatic is benzene, toluene, or xylene; the alkane is n-hexane, n-pentane, or cyclohexane.

5. The method as claimed in claim 1, wherein the hydrophobic dispersion solvent is aromatic or alkane; the aromatic is benzene, toluene, or xylene; the alkane is n-hexane, n-pentane or cyclohexane.

6. The method as claimed in claim 1, wherein the distillation in the solvent evaporation step is performed under atmospheric pressure.

* * * * *